US011969980B2

(12) United States Patent
Nakajima et al.

(10) Patent No.: US 11,969,980 B2
(45) Date of Patent: Apr. 30, 2024

(54) METHOD FOR PRODUCING DECORATIVE MATERIAL

(71) Applicant: Dai Nippon Printing Co., Ltd., Tokyo (JP)

(72) Inventors: Tomomi Nakajima, Tokyo (JP); Yoshiaki Netsu, Tokyo (JP); Toshinaru Kayahara, Tokyo (JP); Yosuke Sumida, Tokyo (JP); Masataka Wada, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 63 days.

(21) Appl. No.: 17/764,225

(22) PCT Filed: Sep. 30, 2020

(86) PCT No.: PCT/JP2020/037218
§ 371 (c)(1),
(2) Date: Mar. 28, 2022

(87) PCT Pub. No.: WO2021/066034
PCT Pub. Date: Apr. 8, 2021

(65) Prior Publication Data
US 2022/0339923 A1 Oct. 27, 2022

(30) Foreign Application Priority Data

Sep. 30, 2019 (JP) .................................. 2019-180478

(51) Int. Cl.
*B32B 37/02* (2006.01)
*B32B 3/28* (2006.01)
(Continued)

(52) U.S. Cl.
CPC ................ *B32B 37/02* (2013.01); *B32B 3/28* (2013.01); *B32B 7/12* (2013.01); *B32B 27/06* (2013.01);
(Continued)

(58) Field of Classification Search
CPC .. B32B 37/02; B32B 3/28; B32B 7/12; B32B 27/06; B32B 37/10; B32B 38/105;
(Continued)

(56) References Cited

U.S. PATENT DOCUMENTS 4,757,731 A * 7/1988 Mohr ........................ B26D 7/04
83/72
7,128,793 B2 * 10/2006 Haldner .................. B32B 31/18
156/64

(Continued)

FOREIGN PATENT DOCUMENTS

CN   101262998 A   9/2008
CN   104703779 A   6/2015
(Continued)

OTHER PUBLICATIONS

WO-2012079713-A1 Machine Translation of Description (Year: 2023).*
(Continued)

*Primary Examiner* — Cynthia L Schaller
(74) *Attorney, Agent, or Firm* — Locke Lord LLP

(57) ABSTRACT

Provided is a method for producing a decorative material, including: a preparation step of preparing sheet printed matters each including a substrate and a picture layer on one surface of the substrate and a roll of a transparent resin film having a first surface and a second surface opposing to each other, the first surface having a pattern of protrusions and depressions, the second surface having a pattern of protrusions and depressions that is shallower than the pattern of
(Continued)

protrusions and depressions on the first surface; an application step of winding off the transparent resin film from the roll of a transparent resin film and applying an adhesive to the second surface of the transparent resin film; and a bonding step of bonding the second surface of the transparent resin film and the picture layer of each of the sheet printed matters with the adhesive.

18 Claims, 2 Drawing Sheets

(51) Int. Cl.
    *B32B 7/12* (2006.01)
    *B32B 27/06* (2006.01)
    *B32B 37/10* (2006.01)
    *B32B 38/00* (2006.01)
    *B32B 38/18* (2006.01)

(52) U.S. Cl.
    CPC ............ *B32B 37/10* (2013.01); *B32B 38/105* (2013.01); *B32B 38/185* (2013.01); *B32B 2250/02* (2013.01); *B32B 2250/05* (2013.01); *B32B 2250/40* (2013.01); *B32B 2250/44* (2013.01); *B32B 2307/4026* (2013.01); *B32B 2307/412* (2013.01); *B32B 2307/7145* (2013.01); *B32B 2451/00* (2013.01)

(58) Field of Classification Search
    CPC .............. B32B 38/185; B32B 2250/02; B32B 2250/05; B32B 2250/40; B32B 2250/44; B32B 2307/4026; B32B 2307/412; B32B 2307/7145; B32B 2451/00; B32B 3/30; B32B 2255/10; B32B 7/05; B32B 37/1284; B32B 37/223
    See application file for complete search history.

(56) References Cited

U.S. PATENT DOCUMENTS

| | | |
|---|---|---|
| 2009/0110804 A1 | 4/2009 | Ogawa et al. |
| 2009/0120573 A1* | 5/2009 | Martin .................... B32B 37/10 |
| | | 156/288 |
| 2012/0171276 A1 | 7/2012 | Fujimori et al. |
| 2015/0202829 A1 | 7/2015 | Toriyama et al. |
| 2016/0143273 A1* | 5/2016 | Takahashi .............. A01N 31/08 |
| | | 424/409 |
| 2021/0379873 A1 | 12/2021 | Furuta et al. |
| 2021/0381248 A1 | 12/2021 | Furuta et al. |
| 2022/0001645 A1 | 1/2022 | Fujii et al. |
| 2022/0009207 A1 | 1/2022 | Furuta et al. |

FOREIGN PATENT DOCUMENTS

| | | | | |
|---|---|---|---|---|
| CN | 105899362 A | | 8/2016 | |
| DE | 102007031051 A1 | * | 1/2009 | |
| EP | 3098071 A1 | | 11/2016 | |
| EP | 3446873 A1 | | 2/2019 | |
| EP | 3950326 A1 | | 2/2022 | |
| JP | S54-037811 A | | 3/1979 | |
| JP | S62-187036 A | | 8/1987 | |
| JP | H02-252531 A | | 10/1990 | |
| JP | H03-150162 A | | 6/1991 | |
| JP | H03-166944 A | | 7/1991 | |
| JP | H06-143518 A | | 5/1994 | |
| JP | H08-001869 A | | 1/1996 | |
| JP | H11-192664 A | | 7/1999 | |
| JP | 2001-192995 A | | 7/2001 | |
| JP | 2003-056168 A | | 2/2003 | |
| JP | 2006-068947 A | | 3/2006 | |
| JP | 2006305810 A | * | 11/2006 | |
| JP | 2009-012472 A | | 1/2009 | |
| JP | 2015-030947 A | | 2/2015 | |
| JP | 2015-140416 A | | 8/2015 | |
| JP | 2017-128836 A | | 7/2017 | |
| JP | 2018-167553 A | | 11/2018 | |
| JP | 2020-062878 A | | 4/2020 | |
| JP | 2020-062879 A | | 4/2020 | |
| JP | 2020-163830 A | | 10/2020 | |
| JP | 2020-175653 A | | 10/2020 | |
| WO | 2011/040048 A1 | | 4/2011 | |
| WO | WO-2012079713 A1 | * | 6/2012 | .............. B08B 1/04 |
| WO | 2020/075561 A1 | | 4/2020 | |
| WO | 2020/075563 A1 | | 4/2020 | |
| WO | 2020/075564 A1 | | 4/2020 | |
| WO | 2020/196303 A1 | | 10/2020 | |

OTHER PUBLICATIONS

JP-2006305810-A Machine Translation of Description (Year: 2023).*
DE-102007031051-A1 Machine Translation of Description (Year: 2023).*
Lu et al., "Preparation and Properties of Antibacterial Polyvinyl Chloride," European Review for Medical and Pharmacological Sciences; 2014; 18; 1448-1453. (Year: 2014).*

* cited by examiner

METHOD FOR PRODUCING DECORATIVE MATERIAL

TECHNICAL FIELD

The present invention relates to a method for producing a decorative material.

BACKGROUND ART

Decorative materials are commonly used for decorating components used in building materials, furniture, home electrical appliances, or the like.

Normally, a decorative material includes a substrate, a decorative sheet laminated to the substrate, and a picture layer which is not directly provided on the substrate but is included in the decorative sheet. Alternatively, a decorative material includes a substrate, a picture layer directly provided on the substrate, and a decorative sheet including a transparent resin film and being laminated to the picture layer on the substrate. Thus, decorative materials have surface properties such as scratch resistance, contamination resistance, and weather resistance.

For example, Patent Literature 1 discloses a decorative material produced by applying a vinyl acetate-based adhesive to a surface of a wood substrate and attaching a decoration sheet to the adhesive-applied surface.

Patent Literature 2, for example, discloses a decorative material produced by bonding a decorative veneer to a substrate with an adhesive, applying an adhesive to the surface of the decorative veneer, laminating a transparent resin film thereto, and applying a finish coating to the surface of the resin film.

CITATION LIST

Patent Literature

Patent Literature 1: JP 2001-192995 A
Patent Literature 2: JP H08-1869 A

SUMMARY OF INVENTION

Technical Problem

Production methods in which a decorative sheet including a picture layer is laminated are disadvantageously difficult to deal with flexible production to meet a market need for picture layers of many kinds in small quantities. In contrast, production methods in which a decorative sheet is laminated to a substrate including a picture directly provided on its surface excellently deals with flexible production of picture layers of many kinds in small quantities.

In the latter production methods in which a decorative sheet is laminated to a substrate on which a picture layer has been formed, however, a decorative sheet for lamination does not have a pattern of protrusions and depressions and therefore cannot sufficiently meet a demand for imparting a three-dimensional design with use of the decorative material.

To deal with this issue, it may be considered to form a pattern of protrusions and depressions on a transparent resin film to be laminated on a substrate including a picture layer by embossing or like processing. However, a pattern of protrusions and depressions corresponding to the pattern of protrusions and depressions on the embossed surface may be unintendedly formed to some degree on the surface opposite to the embossed surface. In the case of using a transparent resin film having such a pattern of protrusions and depressions in methods in which an adhesive is applied to a substrate including a picture layer and a transparent resin film is bonded thereto as disclosed in Patent Literatures 1 and 2 described above, air entrainment, i.e., a phenomenon that air enters into the pattern of protrusions and depressions formed on the transparent resin film may occur upon bonding of the substrate including a picture layer and the transparent resin film, rather lowering the design quality.

The present invention aims to solve the above problem and provide a method for producing a decorative material excellent in design quality, which can prevent or reduce occurrence of air entrainment even when a substrate including a picture layer (sheet printed matter) and a transparent resin film having a pattern of protrusions and depressions are bonded with an adhesive.

Solution to Problem

The present inventors made intensive studies to solve the above problem and arrive at the following findings. When a transparent resin film having a pattern of protrusions and depressions is bonded to a sheet printed matter including a substrate and a picture layer on one surface of the substrate with an adhesive, application of the adhesive to the transparent resin film allows the adhesive to enter the depressions of the pattern of protrusions and depressions on the transparent resin film to favorably wet the entire surface. This prevents air entrainment upon bonding of the transparent resin film to the picture layer side of the sheet printed matter to prevent occurrence of air entrainment, thereby reducing or preventing a decline in the design quality of the picture layer. Thus, the present invention was completed.

Specifically, a method for producing a decorative material of the present invention includes: a preparation step of preparing sheet printed matters each including a substrate and a picture layer on one surface of the substrate and a roll of a transparent resin film having a first surface and a second surface opposing to each other, the first surface having a pattern of protrusions and depressions, the second surface having a pattern of protrusions and depressions that is shallower than the pattern of protrusions and depressions on the first surface; an application step of winding off the transparent resin film from the roll of a transparent resin film and applying an adhesive to the second surface of the transparent resin film; and a bonding step of bonding the second surface of the transparent resin film and the picture layer of each of the sheet printed matters with the adhesive and cutting the transparent resin film in front and at the back of the sheet printed matters to obtain laminates.

In the method for producing a decorative material of the present invention, preferably, the transparent resin film protrudes outside an end portion of each of the sheet printed matters in the laminates, and the method further includes a removal step of stacking the laminates and removing portions of the transparent resin film that protrude from the laminates under application of pressure in a lamination direction.

In the method for producing a decorative material of the present invention, preferably, the transparent resin film of the roll prepared in the preparation step is wound in a manner that the second surface of the transparent resin film faces inside the roll.

Preferably, the application step involves reversing the transparent resin film after application of the adhesive to the second surface of the transparent resin film, prior to the bonding step.

Preferably, the bonding step involves stacking the laminates in a manner that the transparent resin film of a first laminate is in contact with the transparent resin film of a second laminate, and applying pressure to the laminates in a lamination direction.

Preferably, the removal step involves stacking the laminates in pairs in a manner that the transparent resin film of a first laminate is in contact with the transparent resin film of a second laminate and removing portions of the transparent resin film that protrude from the laminates under application of pressure in a lamination direction of the laminates.

Preferably, the transparent resin film includes a surface protective layer on the first surface, and the surface protective layer contains an antibacterial antiviral agent.

Advantageous Effects of Invention

The method for producing a decorative material of the present invention can reduce or prevent occurrence of air entrainment even when a sheet printed matter including a substrate and a picture layer on one surface of the substrate is bonded to a transparent resin film having a pattern of protrusions and depressions, thereby producing a decorative material excellent in design quality.

DESCRIPTION OF EMBODIMENTS

The method for producing a decorative material of the present invention is described in the following.

The method for producing a decorative material of the present invention includes: a preparation step of preparing sheet printed matters each including a substrate and a picture layer on one surface of the substrate and a roll of a transparent resin film having a first surface and a second surface opposing to each other, the first surface having a pattern of protrusions and depressions, the second surface having a pattern of protrusions and depressions that is shallower than the pattern of protrusions and depressions on the first surface; an application step of winding off the transparent resin film from the roll of a transparent resin film and applying an adhesive to the second surface of the transparent resin film; and a bonding step of bonding the second surface of the transparent resin film and the picture layer of each of the sheet printed matters with the adhesive and cutting the transparent resin film in front and at the back of the sheet printed matters to obtain laminates.

Figure 1:
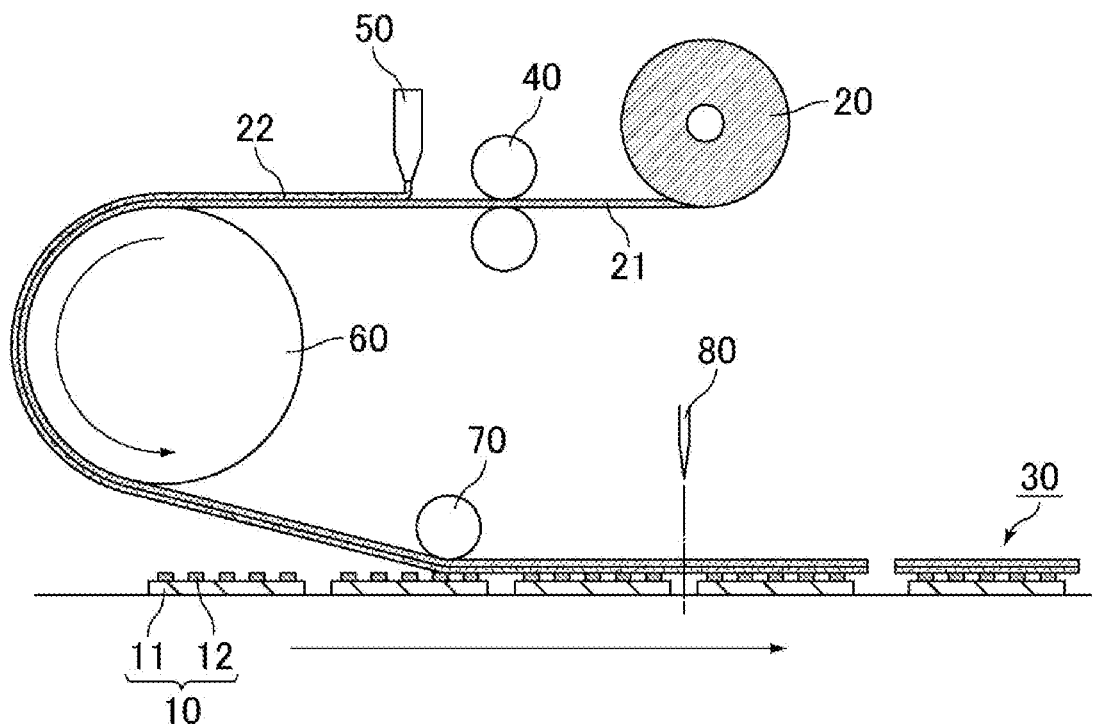
FIG. 1(a) is a cross-sectional view schematically illustrating a preferred example of steps performed in succession including the preparation step, the application step, and the bonding step constituting the method for producing a decorative material of the present invention.
FIG. 1(b) is a cross-sectional view of a preferred example of the removal step constituting the method for producing a decorative material of the present invention.
Figure 1:
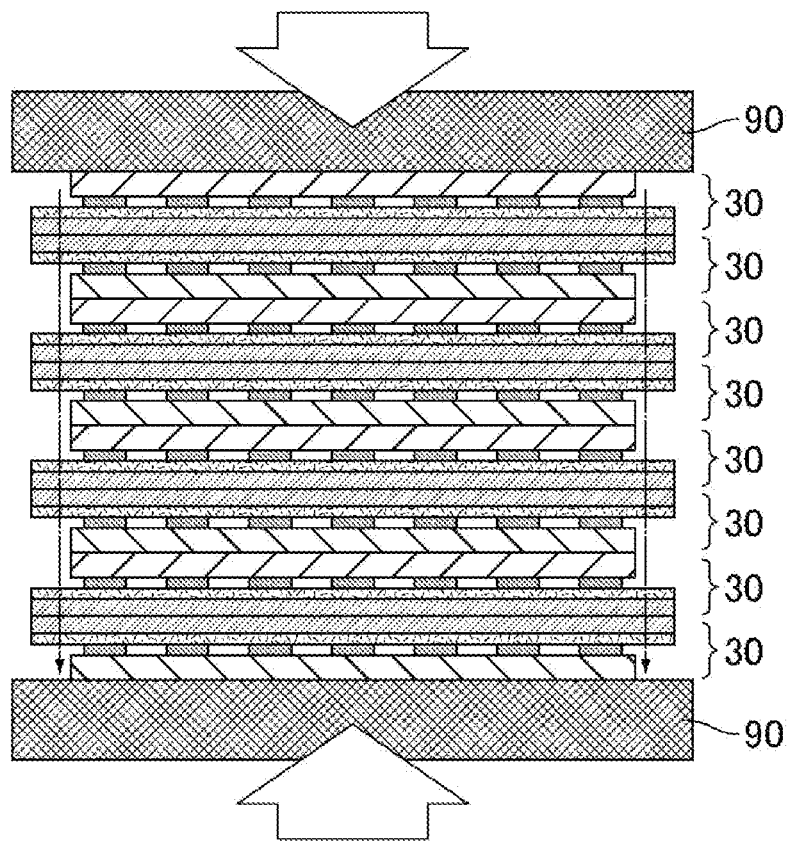

FIG. 1(a) is a cross-sectional view schematically illustrating a preferred embodiment of steps performed in succession including the preparation step, the application step, and the bonding step constituting the method for producing a decorative material of the present invention. As illustrated in FIG. 1(a), the preparation step involves preparing sheet printed matters 10 each including a substrate 11 and a picture layer 12 on one surface of the substrate 11 and a roll 20 of a transparent resin film 21 having a first surface and a second surface opposing to each other in which the first surface has a pattern of protrusions and depressions and the second surface has a pattern of protrusions and depressions that is shallower than the pattern of protrusions and depressions on the first surface.

The application step involves winding off the transparent resin film 21 from the roll 20 by using a conveyance means 40 that includes two nip rolls for catching the film therebetween and drawing the film out, and applying an adhesive 22 to the second surface of the transparent resin film 21 by using an application means 50.

The bonding step involves reversing the transparent resin film 21 using a reverse roll 60 to set the side with the adhesive 22 faces downward, bonding the second surface of the transparent resin film 21 and the picture layer 12 of each of the sheet printed matters 10 with the adhesive 22 by using a roll press machine 70, and cutting the transparent resin film 21 in front and at the back of the sheet printed matters 10 to obtain laminates.

Here, a large number of sheet printed matters 10 to be bonded to the transparent resin film 21 in a continuous state are conveyed independently with intervals therebetween on a transportation device such as a conveyor, and cutting is performed in front and at the back, i.e., at positions of the intervals between the sheet printed matters 10 in a state of being bonded to the continuous transparent resin film 21 in this case. The resulting laminates therefore each include the transparent resin film 21 having ends protruding outside the end portions of the sheet printed matter 10.

The arrows in FIG. 1(a) indicate the traveling directions in the steps.

The phrase "performed in succession" means performance of steps on a series of a production line.

The method for producing a decorative material of the present invention preferably includes a removal step involving stacking the laminates in pairs in a manner that the transparent resin film of the first laminate is in contact with the transparent resin film of the second laminate and removing portions of the transparent resin film that protrude from the laminates under application of pressure in a lamination direction of the laminates.

FIG. 1(b) is a cross-sectional view of a preferred example of the removing step constituting the method for producing a decorative material of the present invention.

In the removal step, multiple pairs of the resulting laminates 30 are stacked in a pillar shape in a manner that the transparent resin films 21 of the laminates in each pair are in contact with each other. To the stack is applied pressure using a press machine 90, and portions of the transparent resin film 21 that protrude from the laminates 30 are cut using a cutting means such as a cutter.

In FIG. 1(b), thick arrows indicate directions along which pressure is applied and thin arrows indicate portions to be removed in the removal step.

In the following, each step is described.

[Preparation Step]

In the preparation step, prepared are sheet printed matters 10 each including a substrate 11 and a picture layer 12 on one surface of the substrate 11 and a roll 20 of a transparent resin film 21 having a first surface and a second surface opposing to each other in which the first surface has a pattern of protrusions and depressions and the second surface has a pattern of protrusions and depressions that is shallower than the pattern of protrusions and depressions on the first surface.

<Sheet Printed Matter>

First, a description is given on the sheet printed matters 10.

The sheet printed matters 10 each include a substrate 11 and a picture layer 12 on one surface of the substrate 11.

(Substrate)

The substrate 11 is not limited and is appropriately determined according to the application of the decorative material.

The substrate 11 may be made of any known material such as a resin material, a wood material, or a metal material. In particular, the material of the substrate is preferably a resin material or a wood material for its rigidity and lightness. The material may also be a composite material of these.

The resin material preferably contains, for example, a thermoplastic resin.

Preferred examples of the thermoplastic resin include: polyvinyl resins such as polyvinyl chloride resins, polyvinyl acetate resins, and polyvinyl alcohol resins; polyolefin resins such as polyethylene, polypropylene, polystyrene, ethylene-vinyl acetate copolymer resins (EVA), and ethylene-(meth) acrylic acid resins; polyester resins such as polyethylene terephthalate resins (PET resins); homopolymers and copolymers of thermoplastic resins such as acrylic resins, polycarbonate resins, polyurethane resins, acrylonitrile-butadiene-styrene copolymer resins (ABS resins), and acrylonitrile-styrene copolymer resins; and resin mixtures of these. In particular, preferred are polyolefin resins, acrylonitrile-butadiene-styrene copolymer resins, polyvinyl chloride resins, and ionomers. The resin material may be foamed.

Examples of the wood material include various materials such as cedar, cypress, zelkova, pine, lauan, teak, and Melapi. The core may be any of sliced veneers, single panels, plywood panels (including LVL), particle boards, medium-density fiberboards (MDF), high-density fiberboards (HDF), and bonded wood made from the above materials and laminated materials prepared by appropriately laminating these.

Examples of the metal material include iron.

The substrate 11 may contain an inorganic compound. The substrate 11 containing an inorganic compound can have a lower linear expansion coefficient, resulting in higher water resistance of a transparent resin film described later.

In the case where the substrate 11 is formed of multiple resin substrates, the types of the resins forming the multiple resin substrates may be the same or different, and the thicknesses of the multiple resin substrates may be the same or different.

The substrate 11 may have a hollow structure or partially have a slit or a through hole.

The substrate 11 may have any size. The size can be appropriately determined in accordance with the application of the decorative material.

The substrate 11 may have any thickness. The thickness is preferably, for example, 0.01 mm or larger, more preferably 0.1 mm or larger and 50 mm or smaller.

The substrate 11 may have a substantially plate shape other than the flat plate shape, such as those including a pattern of protrusions and depressions or a curved surface.

(Picture Layer)

The picture layer 12 is a layer for imparting decorativeness to the decorative material. The picture layer 12 may be, for example, a uniformly colored hiding layer (solid print layer), a design layer formed by printing various patterns using ink and a printer, or a layer combining a hiding layer and a design layer (hereafter, referred to as a pattern layer).

The hiding layer can add an intended color to the substrate which may be stained or colored unevenly, thereby adjusting the color of the surface.

The design layer can provide the decorative sheet with various patterns such as wood-grain patterns, stone grain patterns imitating the surface of a rock such as marble patterns (e.g., pattern of travertine marble), fabric patterns imitating fabric texture or fabric-like patterns, tiled patterns, brick-masonry patterns, and parquet or patchwork patterns which are combinations of the above patterns. These patterns are formed by typical polychromic printing in process colors including yellow, red, blue, and black, or polychromic printing in spot colors in which plates of individual colors constituting the pattern are used.

The ink composition used for the picture layer 12 is a composition prepared by appropriately mixing a binder resin with a colorant such as a pigment and a dye, an extender pigment, a solvent, a stabilizer, a plasticizer, a catalyst, a curing agent, and the like. Any binder resin may be used. Preferred examples thereof include urethane resins, acrylic resins, urethane-acrylic resins, urethane-acrylic copolymer resins, vinyl chloride/vinyl acetate copolymer resins, vinyl chloride/vinyl acetate/acrylic copolymer resins, acrylic resins, polyester resins, and nitrocellulose resins. Any of these binder resins may be used alone or in combination of two or more.

Preferred examples of the colorant include: inorganic pigments such as carbon black (Chinese ink), iron black, titanium white, antimony white, chrome yellow, titanium yellow, red iron oxide, cadmium red, ultramarine, and cobalt blue; organic pigments or dyes such as quinacridone red, iso-indolinone yellow, and phthalocyanine blue; metal pigments formed of foil flakes of aluminum, brass, and the like; and pearl-like luster pigments (pearl pigments) formed of foil flakes of titanium dioxide-coated mica, basic lead carbonate, and the like.

The picture layer 12 may have any thickness. The thickness is preferably 0.1 μm or larger, more preferably 0.5 μm or larger and 600 μm or smaller. Having a thickness within the range indicated above, the picture layer 12 can impart an excellent design to the decorative material and also can have hiding properties.

<Transparent Resin Film>

Next, a description is given on the transparent resin film 21.

The transparent resin film 21 has a first surface and a second surface opposing to each other. The first surface has a pattern of protrusions and depressions and the second surface has a pattern of protrusions and depressions that is shallower than the pattern of protrusions and depressions on the first surface.

The first surface refers to the outermost surface of the transparent resin film 21. In the case where the transparent resin film 21 includes a surface protective layer described later, the outermost surface on the side with the surface protective layer is the first surface and the outermost surface on the other side is the second surface.

(Pattern of Protrusions and Depressions)

The pattern of protrusions and depressions on the first surface is a pattern of protrusions and depressions capable of providing a design to a decorative material, and is preferably adjusted as appropriate, for example, in a manner that the center line average roughness Ra defined in JIS B 0601

(1982) is within a range of 1 μm or more and 30 μm or less and the maximum height Rz defined in JIS B 0601 (2001) is within a range of 20 μm or higher and 200 μm or lower.

The pattern of protrusions and depressions on the second surface may be any pattern of protrusions and depressions that is shallower than the pattern of protrusions and depressions on the first surface.

The pattern of protrusions and depressions may be formed on the first surface by any method. Examples of the method include thermal embossing and transferring of a pattern of protrusions and depressions using a shape-forming sheet.

Thermal embossing may be performed, for example, using a known sheet- or rotary embosser.

Examples of an embossed pattern include a grain pattern, a hairline pattern, a satin pattern, a wood-grain vessel pattern, a pattern of protrusions and depressions of slab surfaces, a fabric surface texture, and a linear streak pattern.

The embossing may be performed at any temperature, preferably at a temperature that reduces a loss of the pattern of protrusions and depressions, i.e., an embossing return, during molding by thermal press bonding.

The pattern of protrusions and depressions on the second surface may be formed by the same method as that for the pattern of protrusions and depressions on the first surface. Alternatively, the pattern of protrusions and depressions on the first surface may be formed in a manner that a pattern of protrusions and depressions corresponding to the pattern of protrusions and depressions on the first surface is formed on the second surface.

(Thermoplastic Resin Layer)

The transparent resin film preferably includes at least a thermoplastic resin layer.

The thermoplastic resin layer is a layer for protecting the picture layer on one side of the substrate described later. The thermoplastic resin layer may be translucent or colored as long as the layer is clear enough to visually recognize the picture layer.

Examples of the thermoplastic resin include: olefin resins such as polyethylene, polypropylene, polybutene, polymethylpentene, and olefin-based thermoplastic elastomers; polyester resins such as polyethylene terephthalate, polybutylene terephthalate, polyethylene naphthalate, ethylene glycol-terephthalic acid-isophthalic acid copolymer resins, terephthalic acid-ethylene glycol-1,4-cyclohexane dimethanol copolymer resins, and polyester-based thermoplastic elastomers; acrylic resins such as polymethyl(meth)acrylate, methyl(meth)acrylate-butyl(meth)acrylate copolymer resins, and methyl(meth)acrylate-styrene copolymer resins; polycarbonate resins; polyvinyl chloride; polystyrene; and ionomers. In particular, polypropylene is favorably used as it has high tensile strength and is excellent in chemical resistance to be advantageous in the production process.

The term "(meth)acrylate" as used herein refers to acrylate or methacrylate.

The thermoplastic resin layer may be unstretched or uniaxially or biaxially stretched, if needed.

The thermoplastic resin layer may have any thickness. The lower limit of the thickness is preferably 20 μm and the upper limit thereof is preferably smaller than 500 μm. The lower limit is more preferably 60 μm and the upper limit is more preferably 420 μm. When the thermoplastic resin layer has a thickness of smaller than 20 μm, the thermoplastic resin layer has insufficient tensile strength, failing to protect the surface of the picture layer. When the thermoplastic resin layer has a thickness of 500 μm or larger, the transparent resin film may have a lower transmittance, resulting in lower visibility of the picture of the picture layer.

The thermoplastic resin layer may have a single-layer structure or a laminated structure including two or more layers.

In the case where the thermoplastic resin layer includes multiple layers, the types of the resins forming the multiple layers may be the same or different, and the thicknesses of the multiple resin layers may be the same or different.

Two or more thermoplastic resin layers may be laminated by any common method. Examples of the method include dry lamination and extrusion thermal lamination.

The thermoplastic resin layer may be subjected to surface treatment such as saponification treatment, glow discharge treatment, corona discharge treatment, plasma discharge treatment, ultraviolet (UV) treatment, or flame treatment, within a range of the gist of the present invention.

(Adhesion Primer Layer)

The transparent resin film 21 preferably includes an adhesion primer layer on the side to be laminated to the picture layer 12 of the thermoplastic resin layer.

The adhesion primer layer can increase the adhesion strength between the transparent resin film 21 and the picture layer 12.

The adhesion primer layer may contain an ultraviolet absorber. The ultraviolet absorber may be appropriately selected from known ultraviolet absorbers.

The adhesion primer layer preferably contains a binder resin.

Examples of the binder resin include urethane resins, acrylic resins, acrylic-urethane resins, acrylic-urethane copolymer resins, cellulosic resins, polyester resins, and vinyl chloride-vinyl acetate copolymer resins. In the case where the ionizing radiation-curable resin composition for a surface protective layer described above contains a urethane acrylate oligomer, the binder resin preferably contains a urethane resin from the standpoint of the adhesion to the picture layer and the production efficiency.

The adhesion primer layer preferably has a thickness of 0.5 μm or larger and 10 μm or smaller. Having a thickness of 0.5 μm or larger, the adhesion primer layer can favorably ensure the adhesion to the picture layer. When the adhesion primer layer has a thickness of 10 μm or smaller, the resulting transparent resin film is not too thick and can have sufficient transparency. Thus, the design quality of the decorative material can be favorably ensured. Also, blocking upon film formation can be prevented or reduced. The term "blocking" refers to a phenomenon that film surfaces of a film prepared by formation of the transparent resin film or application of an adhesion primer and wound on a roll stick to each other.

The adhesion primer layer may further contain inorganic fine particles such as silica particles.

(Surface Protective Layer)

The transparent resin film 21 preferably includes a surface protective layer on the side opposite to the picture layer side of the thermoplastic resin layer.

Having a surface protective layer, the transparent resin film has higher durability (e.g., scratch resistance, contamination resistance, weather resistance) to be able to more favorably protect the surface of the picture layer, favorably preventing impairment of the design quality due to damage on the transparent resin film itself.

The surface protective layer may have a single-layer structure or a multilayer structure including multiple layers formed of the same or different material(s). The following materials may be appropriately mixed to form the surface protective layer.

Any surface protective layer may be used. Examples thereof include those formed of a crosslink-cured product of a two-component curable resin or ionizing radiation-curable resin composition. The crosslink-cured product is preferably clear, and may be translucent or colored as long as the layer is clear enough to visually recognize the picture layer described later.

The two-component curable resin may be, for example, a binder resin of the adhesion primer layer.

The ionizing radiation-curable resin is preferably, for example, an oligomer (including what we call a prepolymer and a macromonomer) having a radical polymerizable unsaturated bond or a cationic polymerizable functional group in the molecule and/or a monomer having a radical polymerizable unsaturated bond or a cationic polymerizable functional group in the molecule. The term "ionizing radiation" herein refers to an electromagnetic wave or charged particle having energy capable of polymerizing or crosslinking molecules. The ionizing radiation is typically an electron beam (EB) or ultraviolet light (UV).

Examples of the oligomer or monomer include compounds having a radical polymerizable unsaturated group (e.g., a (meth)acryloyl group, a (meth)acryloyloxy group) or a cationic polymerizable functional group (e.g., an epoxy group) in the molecule. Each of these oligomers or monomers may be used alone, or two or more thereof may be used in admixture. The term "(meth)acryloyl group" as used herein refers to an acryloyl group or a methacryloyl group.

The oligomer having a radical polymerizable unsaturated group in the molecule is preferably, for example, an oligomer of urethane (meth)acrylate, polyester (meth)acrylate, epoxy (meth)acrylate, melamine (meth)acrylate, or triazine (meth)acrylate, more preferably a urethane (meth)acrylate oligomer. An oligomer having a molecular weight of about 250 to 100000 is typically used.

The monomer having a radical polymerizable unsaturated group in the molecule is preferably, for example, a polyfunctional monomer, more preferably a polyfunctional (meth)acrylate.

Examples of the polyfunctional (meth)acrylate include diethylene glycol di(meth)acrylate, propylene glycol di(meth)acrylate, bisphenol A ethylene oxide-modified di(meth)acrylate, trimethyrolpropane tri(meth)acrylate, trimethylolpropane ethylene oxide tri(meth)acrylate, dipentaerythritol tetra(meth)acrylate, dipentaerythritol penta(meth)acrylate (pentafunctional (meth)acrylate), and dipentaerythritol hexa(meth)acrylate (hexafunctional (meth)acrylate). The term "polyfunctional monomer" herein refers to a monomer having multiple radical polymerizable unsaturated groups.

The ionizing radiation-curable resin composition preferably further contains an ionizing radiation-curable resin component containing a urethane acrylate oligomer and a polyfunctional monomer. The ionizing radiation-curable resin component particularly preferably contains a urethane acrylate oligomer and a polyfunctional monomer at a mass ratio (urethane acrylate oligomer/polyfunctional monomer) of 6/4 to 9/1. Within such a mass ratio range, better scratch resistance can be achieved.

If needed, a monofunctional monomer may be appropriately used in addition to the ionizing radiation-curable resin component.

Examples of the monofunctional monomer include methyl(meth)acrylate, 2-ethylhexyl(meth)acrylate, and phenoxyethyl(meth)acrylate.

In the case where ultraviolet light is used for crosslinking of the ionizing radiation-curable resin composition, a photopolymerization initiator is preferably added to the ionizing radiation-curable resin composition.

In the case where the ionizing radiation-curable resin composition is a resin composition containing a radical polymerizable unsaturated group, the photopolymerization initiator used may be an acetophenone, a benzophenone, a thioxanthone, benzoin, a benzoin methyl ether, or a mixture of these.

In the case where the ionizing radiation-curable resin composition is a resin composition containing a cationic polymerizable unsaturated group, the photopolymerization initiator used may be an aromatic diazonium salt, an aromatic sulfonium salt, an aromatic iodonium salt, a metallocene compound, a benzoin sulfonic acid ester, or a mixture of these. The amount of the photopolymerization initiator is about 0.1 to 10 parts by mass per 100 parts by mass of the ionizing radiation-curable resin component.

The ionizing radiation-curable resin composition may further contain additives, if needed. Examples of the additives include thermoplastic resins (e.g., urethane resins, polyvinyl acetal resins, polyester resins, polyolefin resins, styrene resins, polyamide resins, polycarbonate resins, acetal resins, vinyl chloride-vinyl acetate copolymer resins, vinyl acetate resins, acrylic resins, cellulosic resins), lubricants (e.g., silicone resins, wax, fluororesins), ultraviolet absorbers (e.g., benzotriazole, benzophenone, triazine), light stabilizers (e.g., hindered amine radical scavengers), and colorants (e.g., dyes, pigments).

The electron beam source for the ionizing radiation used may be, for example, an electron beam accelerator of any type (Cockcroft-Walton type, Van de Graaff type, resonant transformer type, insulating core transformer type, linear type, Dynamitron type, radio frequency type) capable of delivering electrons having an energy of 70 to 1000 keV. The electron beam dose is preferably, for example, about 1 to 10 Mrad.

The UV source for the ionizing radiation used may be, for example, a light source such as an ultra-high pressure mercury lamp, a high-pressure mercury lamp, a low-pressure mercury lamp, a carbon-arc lamp, a black light, or a metal halide lamp. The ultraviolet light used typically has a wavelength within a range of 190 to 380 nm.

The surface protective layer may have any thickness. The lower limit of the thickness is preferably 0.1 μm and the upper limit thereof is preferably 50 μm. The lower limit is more preferably 1 μm and the upper limit is more preferably 30 μm. When the surface protective layer has a thickness of smaller than 0.1 μm, sufficient durability (e.g., scratch resistance, contamination resistance, weather resistance) may not be imparted. When the surface protective layer has a thickness of larger than 50 μm, the transparent resin film of the present invention may have a lower transmittance, resulting in lower visibility of the picture of the picture layer.

The surface protective layer may optionally contain additives. Examples of the additives include fillers such as calcium carbonate or clay, flame retardants such as magnesium hydroxide, antioxidants, lubricants, blowing agents, ultraviolet absorbers, light stabilizers, deodorants, antibacterial agents, antiviral agents, antifungal agents, and antiallergen agent.

The surface protective layer preferably contains an antibacterial antiviral agent.

The term "antibacterial antiviral" herein means not only disinfection, sterilization, bacteriostasis, or bacterial eradication by breakdown of bacteria, viruses, and fungi, but also reduction or prevention of their growth or occurrence.

The surface protective layer is a part to be positioned at the outermost surface of the decorative material. The surface protective layer containing an antibacterial antiviral agent can favorably reduce or prevent occurrence or growth of bacteria, viruses, and fungi in the decorative material and enables favorable disinfection, sterilization, bacteriostasis, or bacterial eradication of bacteria, viruses, and fungi adhering to the decorative material.

The antibacterial antiviral agent can be normally roughly classified into the organic type and the inorganic type.

Examples of the organic antibacterial antiviral agent include quaternary ammonium salt-based antibacterial antiviral agents, quaternary phosphonium salt-based antibacterial antiviral agents, pyridine-based antibacterial antiviral agents, pyrithione-based antibacterial antiviral agents, benzimidazole-based antibacterial antiviral agents, organic iodine-based antibacterial antiviral agents, isothiazolin-based antibacterial antiviral agents, and anionic antibacterial antiviral agents.

Examples of the inorganic antibacterial antiviral agent include those obtained by making substances (e.g., zeolite, apatite, zirconia, or glass) to support metal ions (e.g., silver, copper, or zinc).

Among the organic antibacterial antiviral agents, particularly favorably used is an antibacterial antiviral agent based on a benzimidazole compound or anionic compound which can maintain the particulate shape.

The phrase "maintain the particulate shape" means that the agent is not dissolved in a composition to form a cured resin of the surface protective layer (curable resin composition before curing) and is present in the state of particles. The benzimidazole compound particles or anionic compound particles are therefore likely to float up to the surface during the process of forming the surface protective layer, which allows the benzimidazole compound particles or anionic compound particles to be locally present on the outermost surface side of the surface protective layer.

The localized presence of the benzimidazole compound particles or anionic compound particles on the outermost surface side of the surface protective layer can reduce the amount of the antibacterial antiviral agent required for achieveing a certain level of antibacterial and antiviral properties, which can reduce or prevent a decrease in the scratch resistance of the surface protective layer.

The anionic antibacterial antiviral agent is preferably, for example, one containing a styrene polymer derivative compound and an unsaturated carboxylic acid derivative compound.

The styrene polymer derivative compound and the unsaturated carboxylic acid derivative compound preferably contain at least one structure selected from the structures of styrene, sodium sulfonate, acrylic acid, maleic acid, and fumaric acid, more preferably contain all of these structures. The reason for this is that viruses are classified into two types, enveloped viruses and non-enveloped viruses, and the structure of the antibacterial antiviral agent capable of effectively inhibit the activity of each type may be different.

The inorganic antibacterial antiviral agent is preferably a silver-based antibacterial antiviral agent from the standpoint of its excellent safety owing to the absence of biotoxicity. In particular, more preferred is a silver-supporting phosphate glass compound or a silver-zeolite compound because they can exhibit antibacterial and antiviral properties even in a small amount and therefore the amount thereof to be added can be reduced.

The inorganic antibacterial antiviral agent preferably has an average particle size of, for example, 0.1 to 10 μm.

The antibacterial antiviral agent having an average particle size within the above range is favorably dispersed to favorably uniformly impart antibacterial and antiviral properties.

The amount of the antibacterial antiviral agent is, for example, about 0.1 to 10 parts by mass per 100 parts by mass of an ionizing radiation curable resin component.

A primer layer for a surface protective layer is preferably provided between the surface protective layer and the thermoplastic resin layer.

The primer layer for a surface protective layer can increase the adhesion strength between the surface protective layer and the thermoplastic resin layer.

The primer layer for a surface protective layer may contain the ultraviolet absorber.

The primer layer for a surface protective layer used is preferably a layer similar to the adhesion primer layer described above.

<Roll>

The transparent resin film 21 may be wound into a roll by any method that can wind the transparent resin film 21 into a roll, and may be wound around a core or the like using a known film winder.

The transparent resin film 21 used in the roll 20 may have any length, width, and thickness as long as the film can be wound into a roll and has a width wider than the width of the sheet printed matters.

The transparent resin film 21 preferably has a length of, for example, 200 m or longer and 1000 m or shorter.

In order to favorably bonding the sheet printed matters and the transparent resin film, the transparent resin film 21 preferably has a width wider than the width of the sheet printed matter (placed in a manner that the center in the width direction thereof is aligned with the center in the width direction of the transparent resin film) by 10 mm or more at each end.

The transparent resin film 21 preferably has a thickness of, for example, 60 μm or larger and 200 μm or smaller.

The roll 20 preferably has a circular cross-section having a diameter of, for example, 100 mm or larger and 550 mm or smaller.

The diameter of the circular cross-section means a diameter of the roll obtained by winding the film around the core, and the core has an external diameter of about 70 mm or larger and 180 mm or smaller.

The core may be an appropriately selected known core.

The transparent resin film 21 of the roll 20 is preferably prepared in a manner that the second surface of the transparent resin film 21 faces inside the roll.

When the second surface of the transparent resin film 21 faces inside the roll 20, the second surface of the transparent resin film 21 wound off from the roll 21 faces upward, which enables a favorable shift to the application step described later.

<Application Step>

The application step involves winding off the transparent resin film 21 from the roll 20 and applying an adhesive to the second surface of the transparent resin film 21.

First, a description is given on the adhesive 22.

The adhesive 22 is not limited, and an appropriately selected adhesive may be used, such as an aqueous adhesive, a thermosensitive adhesive, a pressure-sensitive adhesive, or a hot-melt adhesive.

From the standpoint of favorable prevention of air entrainment, the adhesive 22 is preferably applied in a manner that the thickness of the applied adhesive is greater than the maximum height Rz of the pattern of protrusions and depressions on the second surface.

From the standpoint of favorable adhesion between the sheet printed matters 10 and the transparent resin film 21, the application width of the adhesive 22 is preferably wider than the width of the sheet printed matter 10 by 5 mm or more at each end but does not protrude from the transparent resin film 21.

The application means 50 for applying the adhesive 22 may employ any application method such as roll coating, comma coating, curtain coating, squeeze coating, blade coating, or gravure coating.

The transparent resin film 21 may be wound off from the roll 20 at any speed (line speed). The line speed may be, for example, 5 to 30 m/min.

The transparent resin film 21 may be wound off from the roll 20 using any means, and the conveyance means 40 may be a known means selected appropriately, such as a nip roll.

<Bonding Step>

The bonding step involves bonding the second surface of the transparent resin film 21 and the picture layers 12 of the sheet printed matters 10 with the adhesive 22 and cutting the transparent resin film 21 in front and at the back of the sheet printed matters 10 to obtain laminates 30.

Prior to the bonding step, the transparent resin film 21 is preferably reversed after application of the adhesive 22 to the second surface of the transparent resin film 21 in the application step.

Reversion of the transparent resin film 21 after application of the adhesive to the second surface of the transparent resin film 21 makes the second surface of the transparent resin film 21 face downward. This allows a favorable shift to the bonding step.

The transparent resin film 21 may be reversed by any means, and a known method such as use of the reverse roll 60 may be appropriately employed.

The bonding step involves cutting the transparent resin film 21 in front and at the back of the sheet printed matters 10. The phrase "in front and at the back of the sheet printed matters" means the front and back of the sheet printed matters 10 in the traveling direction (direction indicated by the arrow in FIG. 1(*a*)) in the bonding step.

The transparent resin film 21 is preferably cut in front and at the back of the sheet printed matters 10 at positions each within a range of 5 mm or more and 10 mm or less from the sheet printed matter 10.

The cutting means 80 is not limited, and a known cutting means such as a rotary cutter, a punching blade (e.g., Thomson blade), or a laser cutter may be used.

From the standpoint of favorable adhesion between the sheet printed matters 10 and the transparent resin film 21, pressure is preferably applied in the lamination direction of the laminates 30 upon bonding of the sheet printed matters 10 and the transparent resin film 21 in the bonding step.

Pressure may be applied in the lamination direction of the laminates 30 by any method, and a flat press machine such as a roll press machine, a vacuum press machine, a hydraulic press machine, or an oil pressure press machine may be appropriately used.

The pressure applied in the lamination direction of the laminates 30 is preferably 10 kg/cm or more and 30 kg/cm or less in the case of using the roll press machine.

During the bonding step, the transparent resin film is preferably heated at 40° C. or higher and 100° C. or lower.

From the standpoint of more favorable bonding between the sheet printed matters 10 and the transparent resin film 21, preferably, the laminates 30 are stacked in a manner that the transparent resin film 21 of the first laminate is in contact with the transparent resin film 21 of the second laminate and pressure is applied in the lamination direction of the laminates 30.

Pressure is applied to the stacked laminates 30 preferably using the above-mentioned flat press machine.

The pressure applied in the lamination direction of the laminates 30 is preferably 2 kg/cm$^2$ or more and 5 kg/cm$^2$ or less.

<Removal Step>

The removal step involves cutting portions of the transparent resin film 21 that protrude from the laminates 30 using a cutting means such as a cutter.

Since application of pressure to the laminates 30 enables more favorable bonding between the sheet printed matters 10 and the transparent resin film 21, the removal step preferably involves removing the portions of the transparent resin film 21 that protrude from the laminates 30 in a state where the laminates 30 in pairs are stacked in a manner that the transparent resin film 21 of the first laminate is in contact with the transparent resin film 21 of the second laminate, under application of pressure in the lamination direction of the laminates 30.

It is more preferred that multiple pairs of the laminates 30 stacked in a manner that the transparent resin films 21 of laminates in each pair are in contact with each other are stacked in a pillar shape and the portions of the transparent resin films 21 that protrude from the laminates 30 are cut under application of pressure using the press machine 90, because the portions of many transparent resin films 21 that protrude can be exposed in the same direction to be cut at once.

The pressure can be applied in the lamination direction of the laminates 30 favorably using the above-mentioned flat press machine.

The pressure applied in the lamination direction of the laminates 30 is preferably 2 kg/cm$^2$ or more and 10 kg/cm$^2$ or less.

The laminates 30 are preferably stacked in a manner that the transparent resin film of the first laminate is in contact with the transparent resin film of the second laminate.

Application of pressure to the laminates 30 in the removal step can be also performed prior to the removal step. Specifically, in the above-described bonding step, multiple pairs of the laminates 30 obtained by cutting the transparent resin film 21 in front and at the back of the sheet printed matters 10 are stacked in a pillar shape in a manner that the transparent resin films 21 of the laminates in each pair are in contact with each other, and pressure is applied in the lamination direction of the laminates 30.

In order to favorably cutting and removing the portions of the transparent resin films that protrude, the number of pairs of the laminates stacked is preferably 10 or more and 100 or less.

The cutting method is not limited, and the same method as the above-described cutting means 80 may be appropriately selected.

<Decorative Material>

Figure 2:
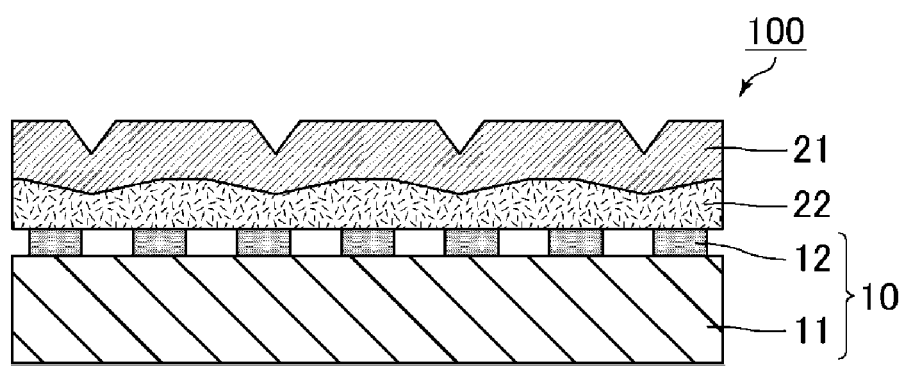
FIG. 2 is a cross-sectional view schematically illustrating an example of a decorative material produced by the method for producing a decorative material of the present invention.

FIG. 2 is a cross-sectional view schematically illustrating an example of a decorative material produced by the method for producing a decorative material of the present invention.

As illustrated in FIG. 2, in a decorative material 100 obtained by the method for producing a decorative material of the present invention, the sheet printed matter 10 and the transparent resin film 21 are stacked with the adhesive 22 therebetween. The sheet printed matter 10 includes the substrate 11 and the picture layer 12 on one surface of the substrate 11, and the transparent resin film 21 having a first surface and a second surface opposing to each other in which the first surface has a pattern of protrusions and depressions and the second surface has a pattern of protrusions and depressions that is shallower than the pattern of protrusions and depressions on the first surface.

Since the method for producing a decorative material of the present invention which produces the decorative material 100 includes the preparation step, the application step, and the bonding step described above, occurrence of air entrainment in the decorative material 100 can be reduced or prevented even when the sheet printed matter 10 including the substrate 11 and the picture layer 12 on one surface of the substrate 11 and the transparent resin film 21 having a pattern of protrusions and depressions are laminated with the adhesive 22 therebetween. Thus, the decorative material 100 is excellent in design quality.

EXAMPLES

In the following, the present invention is more specifically described with reference to, but not limited to, examples.

Example 1

Sheet printed matters each including a substrate and a picture layer on one surface of the substrate were prepared.

Separately, a roll of a transparent resin film having a first surface and a second surface opposing to each other in which the first surface has a pattern of protrusions and depressions and the second surface has a pattern of protrusions and depressions (maximum height Rz: 20 μm) that is shallower than the pattern of protrusions and depressions on the first surface were prepared.

The transparent resin film was wound off from the roll at a line speed of 20 m/min, and a hot-melt adhesive (urethane-based reactive hot-melt adhesive, polyurethane adhesive (TYFORCE FH-100) available from DIC Corporation) melted by heating to 140° C. was applied to the second surface of the transparent resin film in a manner that the application width of the adhesive was wider than the width of the sheet printed matter by about 5 mm on each side (but does not protrude from the transparent resin film) and the application thickness was 30 μm. Then, the surface of the transparent resin film on which the adhesive was not applied was brought into contact with a reverse roll and the transparent resin film was reversed. The second surface of the transparent resin film was bonded to the picture layer side of each sheet printed matter, and they were pressed at 20 kg/cm using a roll press machine.

The transparent resin film bonded to the sheet printed matter was cut in a manner that the transparent resin film was slightly protruding from the sheet printed matter. Thus, a laminate was obtained.

Ten pairs of the resulting laminates were stacked in a manner that the transparent resin films of the laminates in each pair were in contact with each other, and portions of the transparent resin films that protrude were cut and removed under application of 6 kg/cm² of pressure in the lamination direction using a pair of press boards (flat press machine). Thus, a decorative material was produced.

The resulting decorative material was allowed to stand still in an atmosphere of 20° C. and 60% RH for curing of the adhesive.

Comparative Example 1

A decorative material was produced as in Example 1, except that no hot-melt adhesive was applied to the second surface of the transparent resin film and a hot-melt adhesive (urethane-based reactive hot-melt adhesive, a polyurethane adhesive (TYFORCE FH-100) available from DIC Corporation) was applied to the picture layer side surfaces of the sheet printed matters to a thickness of 30 μm.

Example 2

Sheet printed matters each including a substrate and a picture layer on one surface of the substrate were prepared.

Separately, a thermoplastic resin layer having a first surface and a second surface opposing to each other in which the first surface has a pattern of protrusions and depressions and the second surface has a pattern of protrusions and depressions (maximum height Rz: 20 μm) that is shallower than the pattern of protrusions and depressions on the first surface was produced. To the first surface was applied an ionizing radiation curable resin composition (containing 5 parts by mass of a silver-supporting phosphate glass compound having an average particle size of 3 μm per 100 parts by mass of the ionizing radiation curable resin component) by gravure coating, followed by exposure to an ionizing radiation for curing. Thus, a transparent resin film including a surface protective layer having a thickness of 5 μm was produced. The transparent resin film was wounded into a roll.

The transparent resin film was wound off from the roll at a line speed of 20 m/min, and a hot-melt adhesive (urethane-based reactive hot-melt adhesive, polyurethane adhesive (TYFORCE FH-100) available from DIC Corporation) melted by heating to 140° C. was applied to the second surface of the transparent resin film in a manner that the application width of the adhesive was wider than the width of the sheet printed matter by about 5 mm on each side (but does not protrude from the transparent resin film) and the application thickness was 30 μm. Then, the surface of the transparent resin film on which the adhesive was not applied was brought into contact with a reverse roll and the transparent resin film was reversed. The second surface of the transparent resin film was bonded to the picture layer side of each sheet printed matter, and they were pressed at 20 kg/cm using a roll press machine.

The transparent resin film laminated to the sheet printed matter was cut in a manner that the transparent resin film was slightly protruding from the sheet printed matter. Thus, a laminate was obtained.

Ten pairs of the resulting laminates were stacked in a manner that the transparent resin films of the laminates in each pair were in contact with each other, and portions of the transparent resin films that protrude were cut and removed under application of 6 kg/cm² of pressure in the lamination direction using a pair of press boards (flat press machine). Thus, a decorative material was produced.

The resulting decorative material was allowed to stand still in an atmosphere of 20° C. and 60% RH for curing of the adhesive.

<Bonding Properties (Air Entrainment)>

The picture layer of each of the decorative materials obtained in the examples and the comparative example was visually checked from the side of the transparent resin film, and evaluated based on the following criteria.

Table 1 shows the results.

+: The picture layer of the sheet printed matter was visible clearly.

−: The picture layer of the sheet printed matter was not visible clearly.

<Design after Bonding>

The picture layer of each of the decorative materials obtained in the examples and the comparative example was visually checked from the side of the transparent resin film, and evaluated based on the following criteria.

Table 1 shows the results.

+: The design of the picture layer of the sheet printed matter was visible clearly without any change.

−: The design of the picture layer of the sheet printed matter looked discolored.

<Evaluation on Antibacterial Properties>

The decorative materials obtained in the examples and the comparative example were subjected to a test by a method in conformity with Test for antibacterial activity and efficacy (JIS Z 2801) to calculate their antibacterial activity values against *Staphylococcus aureus* and *Escherichia coli*, and evaluated based on the following criteria.

Table 1 shows the results.

+: The antibacterial activity value was 2.0 or more.

−: The antibacterial activity value was less than 2.0.

<Evaluation on Antiviral Properties>

The decorative materials obtained in the examples and the comparative example were subjected to a test by a method in conformity with the method for measuring antiviral activity (ISO 21702) to calculate their antiviral activity values against influenza viruses, and evaluated based on the following criteria.

Table 1 shows the results.

+: The antiviral activity value was 2.0 or more.

−: The antiviral activity value was less than 2.0.

TABLE 1

| Adhesive-applied surface | Example 1 Second surface of transparent resin film | Comparative Example 1 Picture layer side surface of sheet printed matter | Example 2 Second surface of transparent resin film |
|---|---|---|---|
| Application thickness of adhesive | 30 μm | 30 μm | 30 μm |
| Bonding properties (air entrainment) | + | − | + |
| Design after bonding | + | − | + |
| Evaluation on antibacterial properties | − | − | + |
| Evaluatoin on antiviral properties | − | − | + |

In the case of the decorative materials produced by the method for producing a decorative material of the present invention, air entrainment was reduced or prevented and the design of the picture layer was visible without discoloration.

In contrast, in the case of the decorative material of Comparative Example 1 in which a hot-melt adhesive was applied to the picture layer side surface of the sheet printed matter, air entrainment occurred and the design after bonding looked discolored.

In the case of the decorative material of Example 2 which includes a surface protective layer containing an antibacterial agent on the first surface of the transparent resin film, the antibacterial and antiviral properties were confirmed to be excellent.

INDUSTRIAL APPLICABILITY

The present invention can provide a method for producing a decorative material excellent in design quality, which can prevent or reduce occurrence of air entrainment. The decorative material obtainable by the method for producing a decorative material of the present invention is favorably used for building materials such as fittings, doors (e.g., sliding doors), floor materials, wall materials, and ceiling materials, and various decorative molded articles, owing to its excellent design quality.

REFERENCE SIGNS LIST 10 sheet printed matter
11 substrate
12 picture layer
20 roll
21 transparent resin film
22 adhesive
30 laminate
40 conveyance means
50 application means
60 reverse roll
70 roll press machine
80 cutting means
90 press machine
100 decorative material

The invention claimed is:

1. A method for producing a decorative material, comprising:
a preparation step of preparing sheet printed matters each comprising a substrate and a picture layer on one surface of the substrate and a roll of a transparent resin film having a first surface and a second surface opposing to each other, the first surface having a pattern of protrusions and depressions, the second surface having a pattern of protrusions and depressions that is shallower than the pattern of protrusions and depressions on the first surface;
an application step of winding off the transparent resin film from the roll of the transparent resin film and applying an adhesive to the second surface of the transparent resin film; and
a bonding step of bonding the second surface of the transparent resin film and the picture layer of each of the sheet printed matters with the adhesive and cutting the transparent resin film in front and at back of the sheet printed matters to obtain laminates; and
the transparent resin film protrudes outside an end portion of each of the sheet printed matters in the laminates, and
the method further comprises a removal step of stacking the laminates and removing portions of the transparent resin film that protrude from the laminates under application of pressure in a lamination direction.

2. The method for producing a decorative material according to claim 1,
wherein the transparent resin film of the roll prepared in the preparation step is wound in a manner that the second surface of the transparent resin film faces inside the roll.

3. The method for producing a decorative material according to claim 1,
wherein the application step involves reversing the transparent resin film after application of the adhesive to the second surface of the transparent resin film, prior to the bonding step.

4. The method for producing a decorative material according to claim 1,
wherein a second bonding step involves stacking the laminates in a manner that the transparent resin film of a first laminate is in contact with the transparent resin film of a second laminate or the substrate of a first laminate is in contact with the substrate of a second laminate, and applying pressure to the laminates in a lamination direction.

5. The method for producing a decorative material according to claim 1,
wherein the removal step involves stacking the laminates in pairs in a manner that the transparent resin film of a first laminate is in contact with the transparent resin film of a second laminate or the substrate of a first laminate is in contact with the substrate of a second laminate and removing portions of the transparent resin film that protrude from the laminates under application of pressure in a lamination direction of the laminates.

6. The method for producing a decorative material according to claim 1,
wherein the transparent resin film includes a surface protective layer on the first surface, and the surface protective layer contains an antibacterial antiviral agent.

7. The method for producing a decorative material according to claim 2,
wherein the application step involves reversing the transparent resin film after application of the adhesive to the second surface of the transparent resin film, prior to the bonding step.

8. The method for producing a decorative material according to claim 2,
wherein a second bonding step involves stacking the laminates in a manner that the transparent resin film of a first laminate is in contact with the transparent resin film of a second laminate, and applying pressure to the laminates in a lamination direction.

9. The method for producing a decorative material according to claim 3,
wherein a second bonding step involves stacking the laminates in a manner that the transparent resin film of a first laminate is in contact with the transparent resin film of a second laminate, and applying pressure to the laminates in a lamination direction.

10. The method for producing a decorative material according to claim 2,
wherein the removal step involves stacking the laminates in pairs in a manner that the transparent resin film of a first laminate is in contact with the transparent resin film of a second laminate or the substrate of a first laminate is in contact with the substrate of a second laminate and removing portions of the transparent resin film that protrude from the laminates under application of pressure in a lamination direction of the laminates.

11. The method for producing a decorative material according to claim 3,
wherein the removal step involves stacking the laminates in pairs in a manner that the transparent resin film of a first laminate is in contact with the transparent resin film of a second laminate or the substrate of a first laminate is in contact with the substrate of a second laminate and removing portions of the transparent resin film that protrude from the laminates under application of pressure in a lamination direction of the laminates.

12. The method for producing a decorative material according to claim 4,
wherein the removal step involves stacking the laminates in pairs in a manner that the transparent resin film of a first laminate is in contact with the transparent resin film of a second laminate or the substrate of a first laminate is in contact with the substrate of a second laminate and removing portions of the transparent resin film that protrude from the laminates under application of pressure in a lamination direction of the laminates.

13. The method for producing a decorative material according to claim 2,
wherein the transparent resin film includes a surface protective layer on the first surface, and the surface protective layer contains an antibacterial antiviral agent.

14. The method for producing a decorative material according to claim 3,
wherein the transparent resin film includes a surface protective layer on the first surface, and the surface protective layer contains an antibacterial antiviral agent.

15. A method for producing a decorative material, comprising:
a preparation step of preparing sheet printed matters each comprising a substrate and a picture layer on one surface of the substrate and a roll of a transparent resin film having a first surface and a second surface opposing to each other, the first surface having a pattern of protrusions and depressions, the second surface having a pattern of protrusions and depressions that is shallower than the pattern of protrusions and depressions on the first surface;
an application step of winding off the transparent resin film from the roll of the transparent resin film and applying an adhesive to the second surface of the transparent resin film;
a bonding step of bonding the second surface of the transparent resin film and the picture layer of each of the sheet printed matters with the adhesive and cutting the transparent resin film in front and at back of the sheet printed matters to obtain laminates; and
the bonding step involves stacking the laminates in a manner that the transparent resin film of a first laminate is in contact with the transparent resin film of a second laminate or the substrate of a first laminate is in contact with the substrate of a second laminate, and applying pressure to the laminates in a lamination direction.

16. The method for producing a decorative material according to claim 15,
wherein the transparent resin film of the roll prepared in the preparation step is wound in a manner that the second surface of the transparent resin film faces inside the roll.

17. The method for producing a decorative material according to claim 15,
wherein the application step involves reversing the transparent resin film after application of the adhesive to the second surface of the transparent resin film, prior to the bonding step.

18. The method for producing a decorative material according to claim 15, wherein the transparent resin film includes a surface protective layer on the first surface, and the surface protective layer contains an antibacterial antiviral agent.

\* \* \* \* \*